United States Patent
Zhou et al.

(10) Patent No.: US 9,294,606 B2
(45) Date of Patent: Mar. 22, 2016

(54) METHOD FOR REALIZING DOWNLOADING OF MOBILE TERMINAL APPLICATION PROGRAM AND MOBILE TERMINAL

(71) Applicant: HUIZHOU TCL MOBILE COMMUNICATION CO., LTD., Huizhou, Guangdong (CN)

(72) Inventors: Baozhong Zhou, Huizhou (CN); Fengming Wu, Huizhou (CN); Zongyan Huang, Huizhou (CN)

(73) Assignee: HUIZHOU TCL MOBILE COMMUNICATION CO., LTD., HuiZhou, Guangdong (CN)

( * ) Notice: Subject to any disclaimer, the term of this patent is extended or adjusted under 35 U.S.C. 154(b) by 0 days.

(21) Appl. No.: 14/441,634

(22) PCT Filed: Aug. 7, 2013

(86) PCT No.: PCT/CN2013/081026
§ 371 (c)(1),
(2) Date: May 8, 2015

(87) PCT Pub. No.: WO2014/071755
PCT Pub. Date: May 15, 2014

(65) Prior Publication Data
US 2015/0296072 A1    Oct. 15, 2015

(30) Foreign Application Priority Data
Nov. 8, 2012 (CN) .......................... 2012 1 0443256

(51) Int. Cl.
*H04M 1/725* (2006.01)
*H04W 4/00* (2009.01)
(Continued)

(52) U.S. Cl.
CPC ............ *H04M 1/72525* (2013.01); *G06F 8/61* (2013.01); *H04L 67/34* (2013.01); *H04W 4/001* (2013.01)

(58) Field of Classification Search
CPC ......................... H04M 1/72525; H04W 4/001
USPC ............................. 455/414.1–414.4, 418–420
See application file for complete search history.

(56) References Cited

U.S. PATENT DOCUMENTS 7,123,933 B2 * 10/2006 Poor ................. H04M 1/72525
                                                          455/414.1
7,818,734 B2 * 10/2010 Giannini ................... G06F 8/65
                                                          717/168
(Continued)

FOREIGN PATENT DOCUMENTS

CN        101997908 A        3/2011
CN        102469114 A        5/2012
(Continued)

OTHER PUBLICATIONS

International Search Report dated Oct. 9, 2013; PCT/CN2013/081026.

*Primary Examiner* — Sharad Rampuria
(74) *Attorney, Agent, or Firm* — Ladas & Parry LLP (57) ABSTRACT

The method of the present invention adds a plug-in control unit on an operation interface of a mobile terminal, and displays the plug-in control unit on the operation interface. An application program downloading icon pushed by a background server is arranged and displayed on the plug-in control unit, and before the downloading of the application program is completed, the application program downloading icon links to a downloading address of a corresponding application program. An operational instruction of a user is received, a corresponding application program is downloaded, and identification is displayed according to the downloading status. The present invention has the advantage of downloading and installing an application program quickly.

12 Claims, 5 Drawing Sheets

(51) Int. Cl.
*H04L 29/08* (2006.01)
*G06F 9/445* (2006.01)

(56) References Cited

U.S. PATENT DOCUMENTS

| | | | | |
|---|---|---|---|---|
| 7,826,834 B2* | 11/2010 | Hook | ............... | G06F 8/61 455/408 |
| 7,941,656 B2* | 5/2011 | Hans | ............... | G06F 8/61 455/403 |
| 8,340,635 B2* | 12/2012 | Herz | ............... | H04L 63/08 455/411 |
| 8,351,911 B1* | 1/2013 | Martin | ............... | H04M 1/72525 455/414.2 |
| 8,666,385 B2* | 3/2014 | Li | ............... | H04W 4/001 370/419 |
| 8,832,232 B2* | 9/2014 | Kim | ............... | G06F 9/5055 709/219 |
| 8,914,004 B2* | 12/2014 | Cho | ............... | H04W 4/18 379/201.05 |
| 2002/0068554 A1* | 6/2002 | Dusse | ............... | H04L 67/16 455/419 |
| 2004/0205164 A1* | 10/2004 | Jacobs | ............... | H04M 1/72525 709/219 |
| 2011/0055355 A1 | 3/2011 | Lee et al. | | |

FOREIGN PATENT DOCUMENTS

CN          102946599 A      2/2013
WO       2012/119527 A1      9/2012

\* cited by examiner

METHOD FOR REALIZING DOWNLOADING OF MOBILE TERMINAL APPLICATION PROGRAM AND MOBILE TERMINAL

FIELD OF THE INVENTION

The present invention relates to a technical field of mobile communication, and more particularly to a method for realizing downloading of mobile terminal application program and mobile terminal thereof.

BACKGROUND OF THE INVENTION

With the rise of the smart phone's age, the third party programs considerably are increased. The number of the predetermined third party programs is limited since the hardware of the smart phone is confined, so that it is required to download the application programs for the user from the internet network by himself. Currently, most of the download manners are that the user searches the application programs in the application program store or the internet network voluntarily. However, on one hand, it is hard to select one application program from many thousands of application programs. On the other hand, some malware indices the user to download the application program by way of different from downloading channels since the user does not understand the property of the malware so that the malware illegally acquires the income and damages the user rights.

Consequently, there is a need to develop a novel technique to solve the aforementioned problems.

SUMMARY OF THE INVENTION

To solve the aforementioned problems, one objective of the present invention is to provide a method for realizing downloading of mobile terminal application program and mobile terminal thereof so that the user is conveniently and rapidly recommended by third party application program to increase the downloading efficiency.

According to the above objectives, one embodiment of the present invention sets forth a method for realizing downloading of mobile terminal application program, the method comprising the steps of:

(A) adding a plug-in control unit on an operation interface of the mobile terminal, wherein the plug-in control unit is displayed on the operation interface, and the plug-in control unit is used to realize the downloading of an application program;

(B) arranging and displaying a plurality of downloading icons of the application program on the plug-in control unit, wherein the plurality of downloading icons of the application program are pushed by a background server to be obtained and each of the downloading icons in the application program is linked to a downloading address, the step (B) further comprising:

(B1) receiving and storing the application program, which is verified by third party program, by way of the background server;

(B2) periodically pushing the stored application programs to the mobile terminals by way of the background server; and (B3) arranging and displaying the downloading icons of the application programs on the plug-in control unit; and (C) receiving an operational instruction of a user by way of the downloading icons of the application programs, downloading the application programs corresponding to the downloading icons based on the operational instruction, and identifying downloading statuses of the application programs on the plug-in control unit, the step (C) further comprising:

(C1) receiving the operational instruction of the user by way of the downloading icons of the application programs, and downloading the application programs corresponding to the downloading icons based on the operational instruction;

(C2) changing each of the downloading icons of the application programs to a color indication if the application programs corresponding to the downloading icons are downloaded and installed, wherein the color indication represents a complete installation of the application programs; and (C3) activating the application programs corresponding to the downloading icons to implement the application programs when each of the downloading icons of the application programs with the color indication receives a click operation from the user.

In one embodiment, the plug-in control unit is an application program picture and is embedded in a desktop launcher of the mobile terminal during the step (A).

In one embodiment, the step (B) further comprises a step of controlling the plug-in control unit to receive update of the application programs from the background server at a predetermined interval.

In one embodiment, the step (C) of identifying downloading statuses of the application programs on the plug-in control unit further comprises: if the application programs are not installed, the downloading icons of the application programs are set to a gray indication and the application programs in "without installation" statuses are distinguishable; wherein the "without installation" statuses comprise a "without download" status, a "partially downloading status but suspended" status, and a "complete downloaded without installation" status.

In the present invention, a method for realizing downloading of mobile terminal application program comprises the steps of:

(A) adding a plug-in control unit on an operation interface of the mobile terminal, wherein the plug-in control unit is displayed on the operation interface, and the plug-in control unit is used to realize the downloading of an application program;

(B) arranging and displaying a plurality of downloading icons of the application program on the plug-in control unit, wherein the plurality of downloading icons of the application program are pushed by a background server to be obtained and each of the downloading icons in the application program is linked to a downloading address; and (C) receiving an operational instruction of a user by way of the downloading icons of the application programs, downloading the application programs corresponding to the downloading icons based on the operational instruction, and identifying downloading statuses of the application programs on the plug-in control unit.

In one embodiment, the plug-in control unit is an application program picture and is embedded in a desktop launcher of the mobile terminal during the step (A).

In one embodiment, the step (B) further comprises:

(B1) receiving and storing the application program, which is verified by third party program, by way of the background server;

(B2) periodically pushing the stored application programs to the mobile terminals by way of the background server; and (B3) arranging and displaying the downloading icons of the application programs on the plug-in control unit.

In one embodiment, the step (B) further comprises a step of controlling the plug-in control unit to receive update of the application programs from the background server at a predetermined interval.

In one embodiment, the step (B) further comprises:

setting the downloading icons corresponding to the application programs to a color indication when each of the application programs is downloaded and installed completely; and activating the application programs when the color indication of the downloading icons receives a click operation from the user.

In one embodiment, the step (C) further comprises:

(C1) receiving the operational instruction of the user by way of the downloading icons of the application programs, and downloading the application programs corresponding to the downloading icons based on the operational instruction;

(C2) changing each of the downloading icons of the application programs to a color indication if the application programs corresponding to the downloading icons are downloaded and installed, wherein the color indication represents a complete installation of the application programs; and (C3) activating the application programs corresponding to the downloading icons to implement the application programs when each of the downloading icons of the application programs with the color indication receives a click operation from the user.

In one embodiment, the step (C) of identifying downloading statuses of the application programs on the plug-in control unit further comprises: if the application programs are not installed, the downloading icons of the application programs are set to a gray indication and the application programs in "without installation" statuses are distinguishable; wherein the "without installation" statuses comprise a "without download" status, a "partially downloading status but suspended" status, and a "complete downloaded without installation" status.

In the present invention, a mobile terminal comprises:

an adding module of a plug-in control unit, for adding the plug-in control unit on an operation interface of the mobile terminal, wherein the plug-in control unit is displayed on the operation interface, and the plug-in control unit is used to realize the downloading of an application program;

a display control module of the plug-in control unit, for arranging and displaying a plurality of downloading icons of the application program on the plug-in control unit, wherein the plurality of downloading icons of the application program are pushed by a background server to be obtained and each of the downloading icons in the application program is linked to a downloading address; and a downloading control module, for receiving an operational instruction of a user by way of the downloading icons of the application programs, downloading the application programs corresponding to the downloading icons based on the operational instruction, and identifying downloading statuses of the application programs on the plug-in control unit.

In one embodiment, the mobile terminal of claim further comprises an updating module, for controlling the plug-in control unit to receive update of the application programs from the background server at a predetermined interval.

In one embodiment, the mobile terminal of claim further comprises a setting module, for setting the downloading icons corresponding to the application programs to a color indication when each of the application programs is downloaded and installed completely, and for activating the application programs when the color indication of the downloading icons receives a click operation from the user.

The present invention is to provide a method for realizing downloading of mobile terminal application program and mobile terminal thereof so that the user is conveniently and rapidly recommended by third party application program. Since the technique of plug-in control is adopted, a plug-in control unit is installed in the mobile terminal to display the application programs identified by third party for the user. The mobile terminal has the new functions of conveniently downloading the application programs by the user and installing the desired application programs rapidly to increase the downloading efficiency.

DETAILED DESCRIPTION OF THE PREFERRED EMBODIMENTS

The foregoing aspects and many of the attendant advantages of this invention will become more readily appreciated as the same becomes better understood by reference to the following detailed description but rather than limiting of the present invention.

Figure 1:
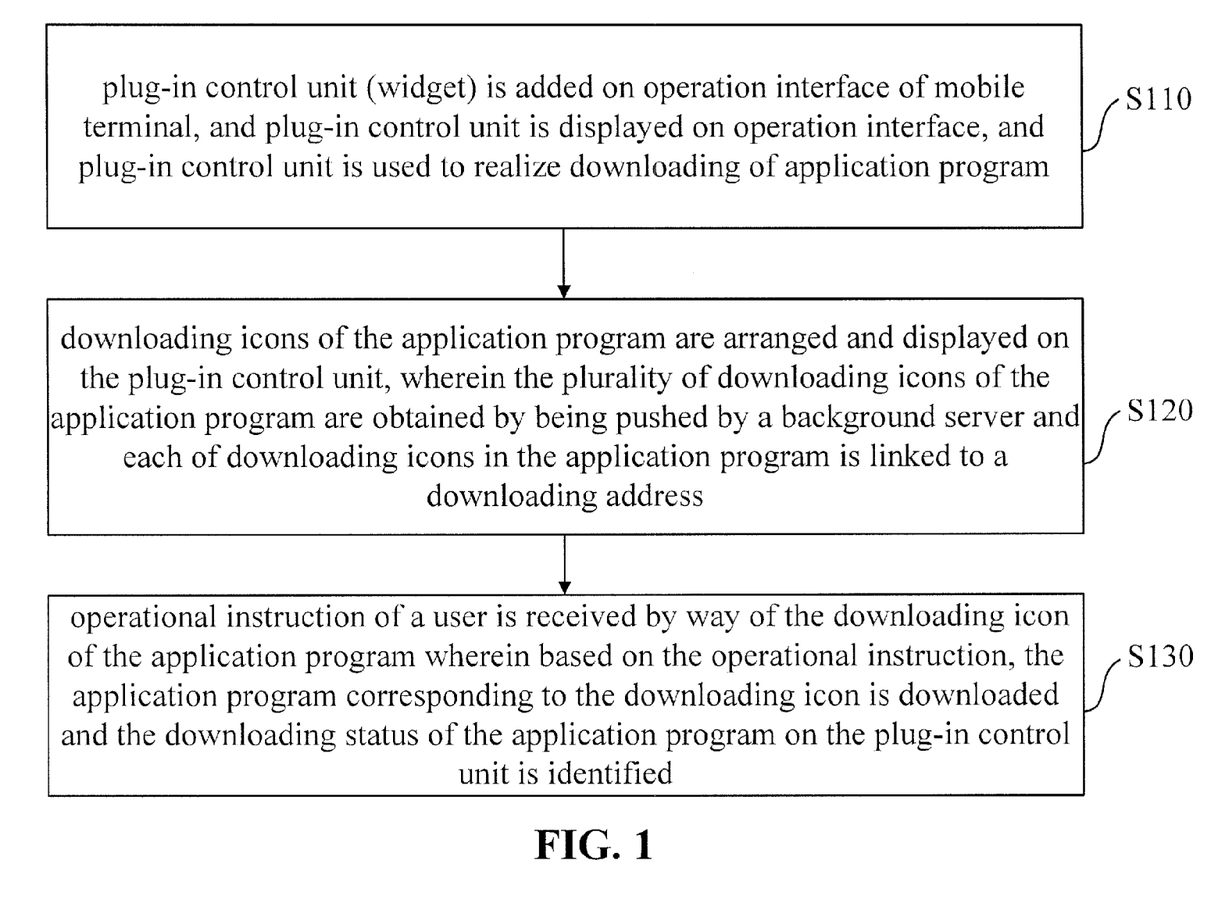
FIG. 1 is a schematic flow chart of a method for realizing downloading of mobile terminal application program according to one preferred embodiment of the present invention.

Referring to FIG. 1, it is a schematic flow chart of a method for realizing downloading of mobile terminal application program according to one preferred embodiment of the present invention. In FIG. 1, the method for realizing downloading of mobile terminal application includes the following steps.

In step S110, a plug-in control unit (widget) is added on an operation interface of the mobile terminal, the plug-in control unit is displayed on the operation interface, and the plug-in control unit is used to realize the downloading of an application program.

In step S110, the plug-in control unit is displayed by way of the formats "xml", "html" and "css", and the user interface (UI) format "js" serves as a script which is a plug-in module with application description technique.

In one embodiment, the plug-in control unit is a small application program picture which is embedded in the various application programs, such as the desktop program of android mobile operating system, and periodically receives the update of the application program. A plug-in control unit for realizing the downloading of mobile terminal application program is added on an operation interface of the mobile terminal by employing the plug-in control technique. Further, the plug-in control technique controls the plug-in control unit to be displayed on the operation interface, so that the plug-in control unit controls the downloading procedure of the various application programs for the mobile terminal. In this case, the plug-in control unit is embedded in the launcher of the desktop program in the mobile terminal and the plug-in control unit is displayed on the operation interface. In other words, the plug-in control unit is displayed on the top layer of the operation interface. When the user operates the mobile terminal and enters the different operation interfaces, the plug-in control unit is displayed on the top layer of the current operation interface.

The plug-in control unit for realizing the downloading of mobile terminal application program is a small application program picture which is embedded in the launcher of the desktop program in the android mobile operating system.

In step S120, a plurality of downloading icons of the application program are arranged and displayed on the plug-in control unit, wherein the plurality of downloading icons of the application program are pushed by a background server to be obtained and each of downloading icons in the application programs is linked to a downloading address.

Figure 4:
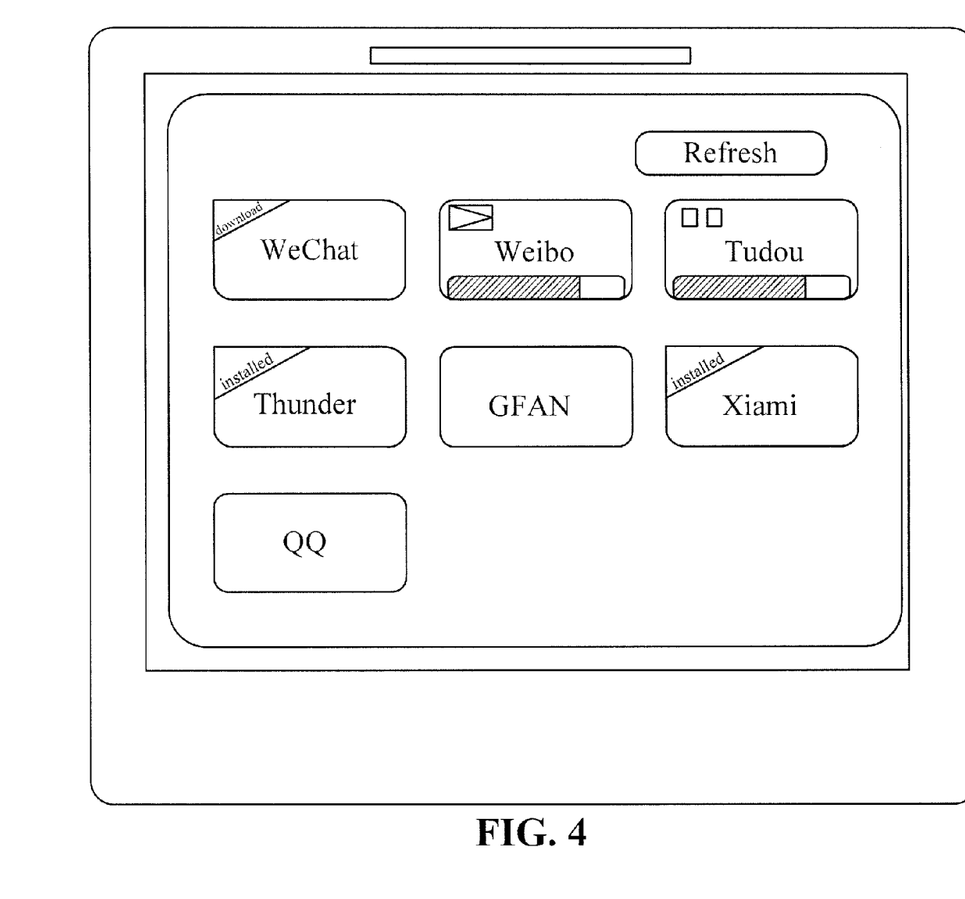
FIG. 4 is a schematic application view of a method for realizing downloading of mobile terminal application program according to one preferred embodiment of the present invention.

The plurality of downloading icons of the application program pushed by a background server to be obtained are arranged and displayed on the plug-in control unit of the mobile terminal so that the user is capable of selecting the downloading icons for downloading and installing the desired application programs. As shown in FIG. 4, the downloading icons of the application programs displayed on the plug-in control unit in the mobile terminal includes: WeChat, Weibo, Tudou, Thunder, GFAN, Xiami and QQ (an instant message software provided by Tencent), so that the user is capable of selecting the downloading icons for downloading and installing the desired application programs. Before the application program is downloaded completely, each of downloading icons corresponding to the application programs is linked to a downloading address.

Figure 2:
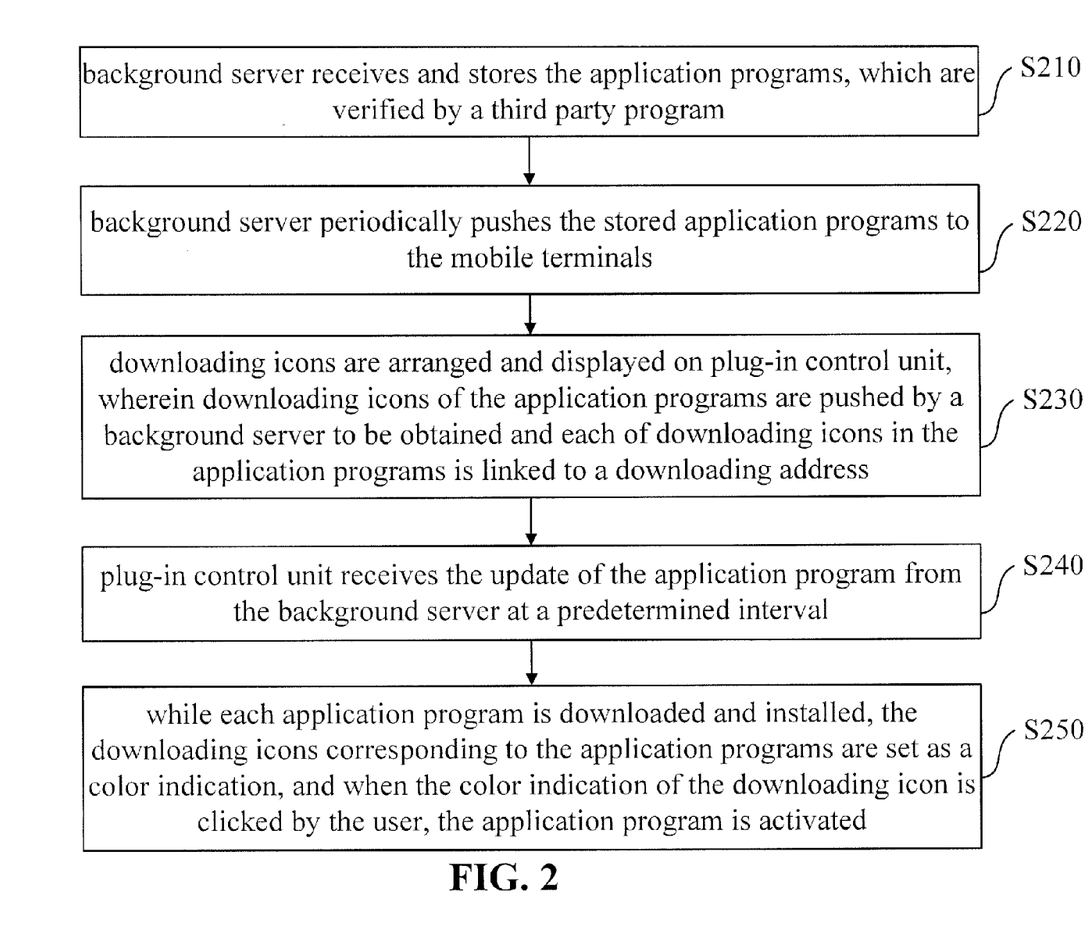
FIG. 2 is a schematic flow chart of a method for realizing downloading of mobile terminal application program wherein the mobile terminal employs the plug-in control unit to select and download the application programs according to one preferred embodiment of the present invention.

To provide the downloading environment of the application program with the safety, speed and reliability, the mobile terminal further implement the following steps before the plurality of downloading icons of the application program pushed by the background server to be obtained are displayed on the plug-in control unit of the mobile terminal by way of hyperlinks. In other words, the step S120 further comprises the following steps S210, S220, S230, S240 and S250.

In step S210, the background server receives and stores the application programs, which are verified by a third party program.

To recommend the application programs with full function and performance stability for the user, the background server corresponding to the mobile terminal selects the received the third party program and stores the application programs with higher rating for the user access.

In step S220, the background server periodically pushes the stored application programs to the mobile terminals.

The background server periodically pushes the stored third party programs to the mobile terminals respectively. The mobile terminals display the application program icons on the plug-in control unit to be selected by the user. For example, the periodical push time may be set as once a week, longer periods of time or shorter periods of time based on the user's requirement. Certainly, the user is capable of controlling the mobile terminal to select one kind or some kinds of application programs to be periodically pushed on the plug-in control unit for the user.

In the step S230, a plurality of downloading icons of the application programs are arranged and displayed on the plug-in control unit, wherein the plurality of downloading icons of the application programs are pushed by a background server to be obtained and each of downloading icons in the application programs is linked to a downloading address.

The mobile terminal arranges and displays a plurality of downloading icons of the application programs, which are pushed by a background server to be obtained, on the plug-in control unit. As shown in FIG. 4, the user controls the mobile terminal to arrange the downloading icons based on the storing time of the application program in the mobile terminal or based on the occupied volume of the application programs. Meanwhile, the user may slide the touch panel of the mobile terminal to view the application program icons in the next page. Each of downloading icons of the application program on the plug-in control unit is linked to a downloading address correspondingly.

In the step S240, the plug-in control unit receives the update of the application program from the background server at a predetermined interval.

Since the update of application programs is quick, the plug-in control unit receives the update of the application program, i.e. up-to-date application program, for download at a predetermined interval from the background server, so that the user can access the latest and full-fledged application program. Based on the user's requirement, the predetermined interval is set to one week or shorter periods of time. Further, the user controls the mobile terminal to manually refresh the update status of the application program. The user may also find whether the update application programs exist on the plug-in control unit and determines whether to update the application programs.

While the application program is recommended to the plug-in control unit and the user clicks the update button, the server is checked to determine whether a new application program list exist in the server. If no, it prompts that the current application program list is a latest one and there is no need to update. If yes, the plug-in control unit downloads the new application program list, downloads the related data and images based on the content of the new application program list, and updates the picture of the plug-in control unit asynchronously.

In step S250, while each application program is downloaded and installed, the downloading icons corresponding to the application programs are set as a color indication. When the color indication of the downloading icon is clicked by the user, the application program is activated.

In this embodiment, the mobile terminal receives the user's instruction to issue a request to download the application program list by way of automatic update or manual update.

Based on user information corresponding to different application program lists, various mobile terminals acquires different application program list to satisfy the requirement of various terminal models mapping to different recommendation of the application program list.

To ensure that the user's mobile terminal identify which application programs are downloaded and installed completely, which application programs are not downloaded, and which application programs are downloaded but not installed, the downloading icons corresponding to the application programs are set to a color indication while each application program is downloaded and installed in the plug-in control unit of the mobile terminal. Specifically, the downloading icons corresponding to the application programs are set to a gray color indication before downloading and installing, and the downloading icons corresponding to the application programs are set to a color indication after downloading and installing completely. When the color indication of the downloading icons is clicked by the user, the application programs are activated.

Proceed to step S130 after the step S120 is complete.

In the step S130, an operational instruction of a user is received by way of the downloading icons of the application programs. Based on the operational instruction, the application programs corresponding to the downloading icons are downloaded, and the downloading statuses of the application programs on the plug-in control unit are identified.

The mobile terminal selects the desired application program for download according to the downloading icons of the application programs on the plug-in control unit, downloads the desired application program by clicking the downloading icon of the application program, and displays the downloading status of the application program in real-time to show the corresponding indication. As shown in FIG. 4, application program WeChat is downloaded and installed, application program Weibo is downloading, the downloading status of application program Tudou suspends, application program Thunder is downloaded and installed, application program GFAN is recommended to the user but is not downloaded, and application program Xiami is downloaded and installed.

Figure 3:
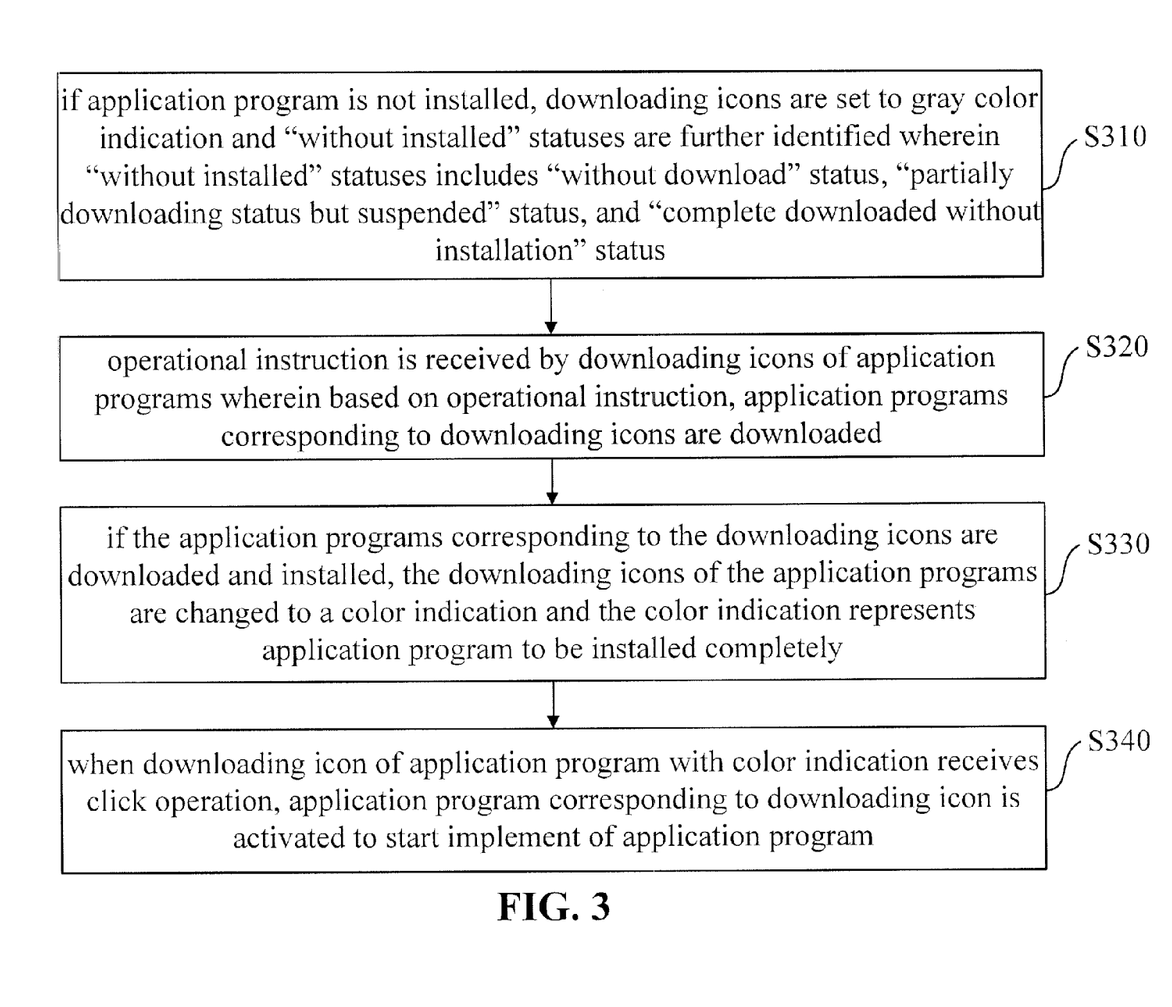
FIG. 3 is a schematic flow chart of a method for realizing downloading of mobile terminal application program wherein the mobile terminal employs the plug-in control unit to download and install the application programs according to one preferred embodiment of the present invention.

Specifically, after the mobile terminal shows the corresponding indication, the following steps are implemented in FIG. 3.

In step S310, if the application program is not installed, the downloading icons of the application programs are set to a gray color indication and the "without installed" statuses of the application programs are further identified wherein the "without installed" statuses includes a "without download" status, a "partially downloading status but suspended" status, and a "complete downloaded without installation" status. As shown in FIG. 4, the indication "download" in the top left corner of the application program icon is in the "without downloaded" status.

Based on the step S250, while some application programs are not installed successfully, the mobile terminal controls the downloading icons corresponding to the application programs to be a gray color indication, and the downloading icons corresponding to the application programs indicate that the application programs are in "without installed" statuses, wherein the "without installed" statuses includes a "without downloaded" status, a "partially downloading status but suspended" status, and a "complete downloaded without installed" status. As shown in FIG. 4, the indication "download" in the top left corner of the application program icon WeChat is in the "without installed" status. As shown in FIG. 4, the indication "install" in the top left corner of the application program icon, e.g. application programs Thunder and Xiami, is in the "complete downloaded but not installed" status. As shown in FIG. 4, the indications "downloading" and "partially downloading status but suspended" in the top left corner of the application program icon, e.g. application programs Weibo and Tudou, are in the "downloading" status to show the downloading rate of the progress. As shown in FIG. 4, no indication in the top left corner of the application program icon, e.g. application programs GFAN and QQ, is in the "downloaded and installed" status.

Specifically, when it is normally in a download status, the top left corner of the plug-in control unit is changed to a downloading status to start downloading; otherwise, it will be prompted by unavailable causes, e.g. network implication or storing problem. If the download status pauses, the top left corner of the application program icon is changed to a pause status.

If the application program is downloaded and installed, the status of the top left corner of the application program icon hides and the application program icon is bright, i.e. without gray color indication.

In step S320, an operational instruction of a user is received by way of the downloading icons of the application programs. Based on the operational instruction, the application programs corresponding to the downloading icons are downloaded.

The user clicks the downloading icon of the application program on the plug-in control unit to activate the downloading instruction corresponding to the application program, and the mobile terminal downloads the application program based on the downloading instruction.

In step S330, if the application programs corresponding to the downloading icons are downloaded and installed, the downloading icons of the application programs are changed to a color indication and the color indication represents application program to be installed completely.

When the downloaded application program clicked by user is installed completely, the downloading icon of the application program is changed to a color indication based on the step S250 to prompt the user the complete installation of the application program.

In step S340, when the downloading icon of the application program with color indication receives the click operation of the user, the application program corresponding to the downloading icon is activated to start the implement of the application program.

When the application program is installed, the top left corner of the application program has no indication and the downloading icon is changed from gray color indication to color indication. Thus, the user can click the downloading icon of the application program to activate the application program for executing the application program conveniently.

The theorems and embodiments which the plug-in control unit implements the downloading manner are described below in detail.

Firstly, data persistence is described. When the plug-in control unit implements the downloading procedure of the application program, there is a need to control the various downloading statuses. For example, the downloading statuses includes a series of logic control statuses, e.g. downloading duration, a network interruption, system rebooting during a downloading process, a pause status, a complete download status, without installed status, and complete installed status. Since the variables of logic determination are recycled aperiodically, it is required to retain the status data when the plug-in control unit implements the downloading of the application program as if the accelerated parallel processing (APP) performs the downloading of the application program in the general store. In this case, the function of "SharedPreferences" is used to implement the data persistence wherein "SharedPreferences" is a lightweight storing class in the Android operating system platform for retaining the common arrangement, e.g. window statuses. The codes of the implement are described below:

```
/**
 * determining whether to downloading the complete
   status of "APK"
 * @param context
 * @param statu
 * @param packageName
 */
public void setApkStatu(Context context,int statu,
   String packageName){
      SharedPreferences           uiState       =
context.getSharedPreferences("ApkStatu",
```

-continued

```
       Activity.MODE_PRIVATE);
           SharedPreferences.Editor editor = uiState.edit( );
           // adding value
           editor.putInt(packageName, statu);
           editor.commit( );
       }
```

Secondly, the data associated with the plug-in control unit cannot be cancelled by user to avoid the data failure. In thus embodiment, the plug-in control unit for implementing the download of application program in the mobile terminal is cable of clearing the data by way of the arrangement in the Android operating system as if the general application program performs the clearing procedure. After the data are cleared, the application program returns back the initial installation status and the data base of the application program and related documents are cancelled. The cancellation difference between the plug-in control unit for implementing the download of application program in the mobile terminal and general application program is that:

After the data associated with the application program are cleared, the life cycle of the data is over. When the user switches back to implement the application program, the application program is activated in an initial status.

However, in the present invention, the plug-in control unit in form of a picture is formed on the desktop program, the data of the application program interface are not actively refreshed. After the data are cleared, however, the picture of the plug-in control on the desktop viewed by the user is a picture with the data. While the user operates the plug-in control unit, there is no data to be operated, which results in failure control. Therefore, it is required to determine whether the data exist during the operation of the plug-in control unit. The codes of the implement are described below:

```
       if(intent==null){
         return;
       }
       context                                         =
AppWidgetApplication.getInstance( ).getApplicationContext( ):
         title_name = intent.getStringExtra(Constant.APP_NAME);
         view_postion = intent.getIntExtra(Constant.VIEW_POSITION,0);
         package_name = intent.getStringExtra(Constant.PACKAGE-
_NAME);
         activity_sart_name                           =
intent.getStringExtra(Constant.ACTIVITY_START_NAME);
         apk_url = intent.getStringExtra(Constant.APK_URL);
            statuSharePreference = new StatusSharePreferense( );
            if(!statuSharePreferense.getRunStatu(context)){
              Toast.makeText(this, "the data in the memory is cleared
and the application program list is refreshed to load the data again",
Toast.LENGTH_LONG).show( );
                DataView.getInstance( ).refresh(this);
                return;
            }
```

The data existence of the plug-in control unit is confirmed by determining whether the related documents exist in the plug-in control unit or not. After the data in the plug-in control unit are cleared, the application program interface is refreshed so that the picture of the plug-in control unit is the same as the data in the background server synchronously.

Thirdly, the plug-in control unit implements the user interface (UI) interaction of the downloading operation of application program.

In this embodiment, the plug-in control unit is utilized according to the "RemoteViews" so that the plug-in control unit implements the interaction of the downloading operation of application program. It is necessary to enrich the interface of the application program by way of an extending manner. In this embodiment, an activity window is activated by the plug-in control unit to serve as a dialog frame for the extending manner.

Generally, the activity window is a full-screen and it is activated to be found in the task stacks of the Android operating system. In one embodiment, the plug-in control unit serves as a component of the window and is placed on the desktop program wherein the component is not an individual module and does not activated in the activity window stacks.

Thus, it is necessary to process the activity window with the dialog frame so that the activity window looks like a dialog frame component generated by the plug-in control unit.

The activity window is defined as a dialog frame, which is a format with non-full screen, no title, dim background and semi-transparent frame. The codes of the implement are described below:

```
       <style name="downloadDialog" parent="@android:style/
         Theme.Dialog">
         <item name="android:windowFrame">@null</item>// set the
         frame
         <item name="android:backgroundDimEnabled">true</item>//
         enable or
       disable the dim background
         <item name="android:windowIsTranslucent">true</item>//set
       to
       be semi-transparent
         <item name="android:windowNoTitle">true</item>//set to
         be no title
         <item name="android:windowFullscreen">false</item>//set to
       be the full screen if the dialog frame is false
         <item name="android:width">310dip</item>//set the width
       </style>
```

When the activity window is set completely, it is required to do the following procedure to form an activity window without task stacks and history records therein when announcing the activity window if the activity window occurs in the recent task stacks.

```
   <activity android:name=".DownloadDialogActivity"
android:configChanges="orientation|keyboardHidden|navigation"
       android:noHistory="true"
       android:finishOnTaskLaunch="true"
       android:launchMode="singleTop"
       android:excludeFromRecents="true"
       android:label="downloading "
       android:screenOrientation="portrait"
       android:theme="@style/downloadDialog">
   </activity>
```

After completing the setting, the active window serves as a component of the pop-up dialog of the plug-in control unit, as show in FIG. 4.

Further, a searching item is set in the plug-in control unit to allow the user to search other application programs. This manner allows the user to find desired application program in the plug-in control unit. Moreover, a forward item and a backward item are disposed on the plug-in control unit so that user is able to page up or page down the application programs of the plug-in control unit.

In the present invention, a plug-in control unit for downloading the application programs to the mobile terminal therein. A plurality of application program downloading icons pushed by a background server are arranged and displayed on the plug-in control unit, and the application program downloading icons are linked to downloading addresses of corresponding third party programs so that user can conveniently and rapidly download the safe application programs.

Figure 5:
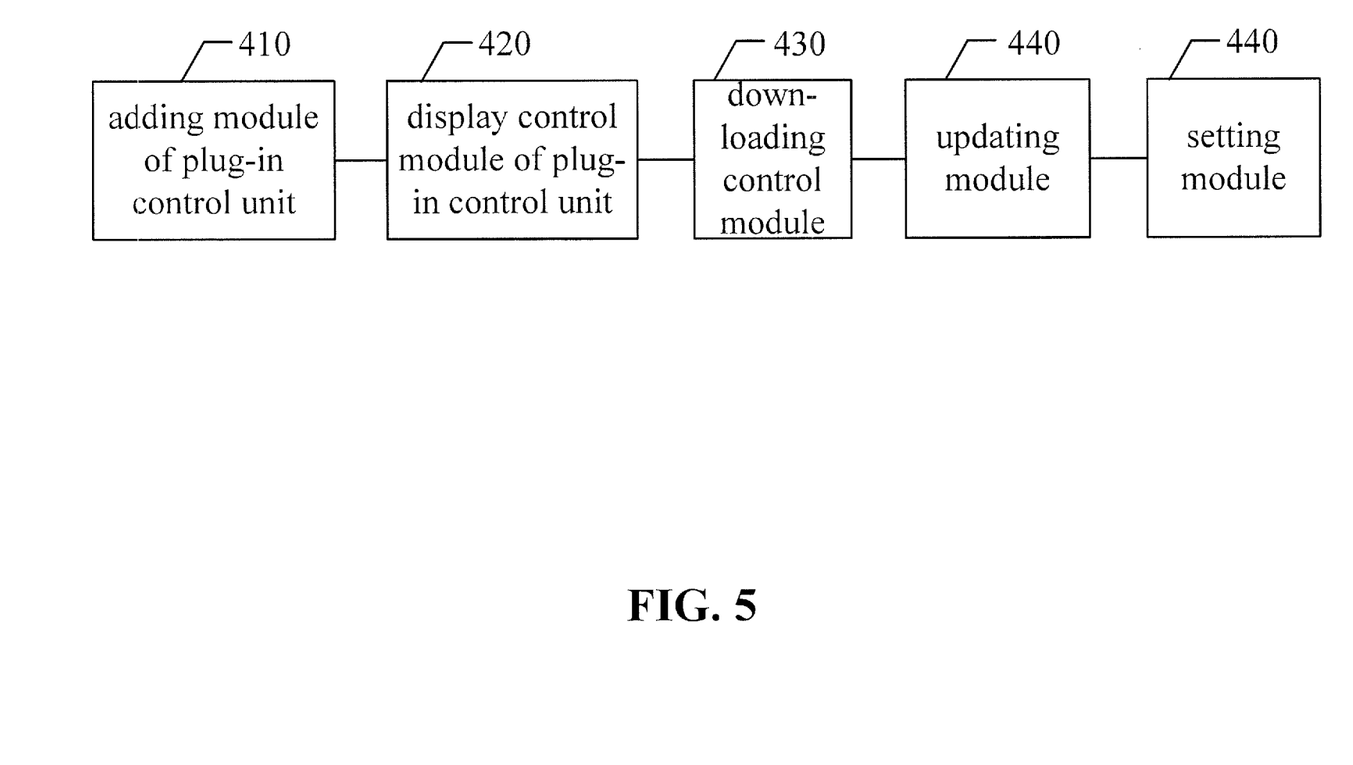
FIG. 5 is a schematic block diagram of the functional principle of a mobile terminal according to one preferred embodiment of the present invention.

Based on the above-mentioned method, the present invention further describes a mobile terminal to implement the method for realizing downloading of mobile terminal application program, as shown in FIG. 5. The mobile terminal includes the following modules.

An adding module 410 of a plug-in control unit is used to add the plug-in control unit on an operation interface of the mobile terminal, wherein the plug-in control unit is displayed on the operation interface, and the plug-in control unit is used to realize the downloading of an application program, as described in the step S110.

A display control module 420 of the plug-in control unit is used to arrange and display a plurality of downloading icons of the application program on the plug-in control unit, wherein the plurality of downloading icons of the application program are pushed by a background server to be obtained and each of the downloading icons in the application program is linked to a downloading address, as described in the step S120.

A downloading control module 430 is used to receive an operational instruction of a user by way of the downloading icons of the application programs, downloading the application programs corresponding to the downloading icons based on the operational instruction, and identifying downloading statuses of the application programs on the plug-in control unit, as described in the step S130.

Further, the mobile terminal further includes the following modules:

An updating module 440 is used to control the plug-in control unit to receive update of the application programs from the background server at a predetermined interval, as described in the step S240.

A setting module 450 is used to set the downloading icons corresponding to the application programs to a color indication when each of the application programs is downloaded and installed completely, and to activate the application programs when the color indication of the downloading icons receives a click operation from the user, as described in the step S250.

According to the aforementioned descriptions, the present invention solves the problem of which the user faces the considerable amount of application programs in the internet network. It is hard to distinguish the authenticity, goodness and badness of the application programs when the user selects the application program. For the user of the mobile terminal, it is inconvenient that the user cannot rapidly found the desired application programs and some viruses exist in the application programs of malice websites on the Internet network. The present invention adds a plug-in control unit on the terminal mobile for realizing downloading of mobile terminal application program. The background server selects the application programs identified by the third party and the identified application programs are stored in the background server. The plug-in control unit displays the application programs pushed by the background server so that user is cable of selecting, downloading and installing the application programs based on the downloading icons. When the user finds and downloads the desired application programs, the present invention solves the difficulty to conveniently and rapidly download various application programs and to increase the user experience and satisfaction.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A method for realizing downloading of mobile terminal application program, the method comprising the steps of:
   (A) adding a plug-in control unit on an operation interface of the mobile terminal, wherein the plug-in control unit is displayed on the operation interface, and the plug-in control unit is used to realize the downloading of an application program;
   (B) arranging and displaying a plurality of downloading icons of the application program on the plug-in control unit, wherein the plurality of downloading icons of the application program are pushed by a background server to be obtained and each of the downloading icons in the application program is linked to a downloading address, the step (B) further comprising:
      (B1) receiving and storing the application program, which is verified by third party program, by way of the background server;
      (B2) periodically pushing the stored application programs to the mobile terminals by way of the background server; and
      (B3) arranging and displaying the downloading icons of the application programs on the plug-in control unit; and
   (C) receiving an operational instruction of a user by way of the downloading icons of the application programs, downloading the application programs corresponding to the downloading icons based on the operational instruction, and identifying downloading statuses of the application programs on the plug-in control unit, the step (C) further comprising:
      (C1) receiving the operational instruction of the user by way of the downloading icons of the application programs, and downloading the application programs corresponding to the downloading icons based on the operational instruction;
      (C2) changing each of the downloading icons of the application programs to a color indication if the application programs corresponding to the downloading icons are downloaded and installed, wherein the color indication represents a complete installation of the application programs; and
      (C3) activating the application programs corresponding to the downloading icons to implement the application programs when each of the downloading icons of the application programs with the color indication receives a click operation from the user.

2. The method for realizing downloading of mobile terminal application program of claim 1, wherein the plug-in control unit is an application program picture and is embedded in a desktop launcher of the mobile terminal during the step (A).

3. The method for realizing downloading of mobile terminal application program of claim 1, wherein the step (B) further comprises a step of controlling the plug-in control unit to receive update of the application programs from the background server at a predetermined interval.

4. The method for realizing downloading of mobile terminal application program of claim 1, wherein the step (C) of identifying downloading statuses of the application programs on the plug-in control unit further comprises:

if the application programs are not installed, the downloading icons of the application programs are set to a gray indication and the application programs in "without installation" statuses are distinguishable;

wherein the "without installation" statuses comprise a "without download" status, a "partially downloading status but suspended" status, and a "complete downloaded without installation" status.

5. A method for realizing downloading of mobile terminal application program, the method comprising the steps of:

(A) adding a plug-in control unit on an operation interface of the mobile terminal, wherein the plug-in control unit is displayed on the operation interface, and the plug-in control unit is used to realize the downloading of an application program;

(B) arranging and displaying a plurality of downloading icons of the application program on the plug-in control unit, wherein the plurality of downloading icons of the application program are pushed by a background server to be obtained and each of the downloading icons in the application program is linked to a downloading address, wherein the step (B) further comprises a step of controlling the plug-in control unit to receive update of the application programs from the background server at a predetermined interval; and (C) receiving an operational instruction of a user by way of the downloading icons of the application programs, downloading the application programs corresponding to the downloading icons based on the operational instruction, and identifying downloading statuses of the application programs on the plug-in control unit.

6. The method for realizing downloading of mobile terminal application program of claim 5, wherein the plug-in control unit is an application program picture and is embedded in a desktop launcher of the mobile terminal during the step (A).

7. The method for realizing downloading of mobile terminal application program of claim 5, wherein the step (B) further comprises:

(B1) receiving and storing the application program, which is verified by third party program, by way of the background server;

(B2) periodically pushing the stored application programs to the mobile terminals by way of the background server; and (B3) arranging and displaying the downloading icons of the application programs on the plug-in control unit.

8. The method for realizing downloading of mobile terminal application program of claim 5, wherein the step (B) further comprises:

setting the downloading icons corresponding to the application programs to a color indication when each of the application programs is downloaded and installed completely; and activating the application programs when the color indication of the downloading icons receives a click operation from the user.

9. The method for realizing downloading of mobile terminal application program of claim 5, wherein the step (C) further comprises:

(C1) receiving the operational instruction of the user by way of the downloading icons of the application programs, and downloading the application programs corresponding to the downloading icons based on the operational instruction;

(C2) changing each of the downloading icons of the application programs to a color indication if the application programs corresponding to the downloading icons are downloaded and installed, wherein the color indication represents a complete installation of the application programs; and (C3) activating the application programs corresponding to the downloading icons to implement the application programs when each of the downloading icons of the application programs with the color indication receives a click operation from the user.

10. The method for realizing downloading of mobile terminal application program of claim 5, wherein the step (C) of identifying downloading statuses of the application programs on the plug-in control unit further comprises:

if the application programs are not installed, the downloading icons of the application programs are set to a gray indication and the application programs in "without installation" statuses are distinguishable;

wherein the "without installation" statuses comprise a "without download" status, a "partially downloading status but suspended" status, and a "complete downloaded without installation" status.

11. A mobile terminal, comprising:

an adding module of a plug-in control unit, for adding the plug-in control unit on an operation interface of the mobile terminal, wherein the plug-in control unit is displayed on the operation interface, and the plug-in control unit is used to realize the downloading of an application program;

a display control module of the plug-in control unit, for arranging and displaying a plurality of downloading icons of the application program on the plug-in control unit, wherein the plurality of downloading icons of the application program are pushed by a background server to be obtained and each of the downloading icons in the application program is linked to a downloading address;

a downloading control module, for receiving an operational instruction of a user by way of the downloading icons of the application programs, downloading the application programs corresponding to the downloading icons based on the operational instruction, and identifying downloading statuses of the application programs on the plug-in control unit; and an updating module, for controlling the plug-in control unit to receive update of the application pro rams from the background server at a predetermined interval.

12. The mobile terminal of claim 11, further comprising a setting module, for setting the downloading icons corresponding to the application programs to a color indication when each of the application programs is downloaded and installed completely, and for activating the application programs when the color indication of the downloading icons receives a click operation from the user.

* * * * *